United States Patent [19]

Maurin

[11] 3,758,612

[45] Sept. 11, 1973

[54] DEHYDRATION OF DIOLS USING LITHIUM PHOSPHATE CATALYST

[75] Inventor: Jean Maurin, Montivilliers, France

[73] Assignee: Compagnie Francaise de Raffinage, Paris, France

[22] Filed: Apr. 20, 1972

[21] Appl. No.: 245,798

Related U.S. Application Data

[62] Division of Ser. No. 30,276, April 20, 1970, abandoned.

[30] Foreign Application Priority Data

Apr. 22, 1969 France ............................. 6912684

[52] U.S. Cl. .............................................. 260/681
[51] Int. Cl. .............................................. C07c 1/24
[58] Field of Search ................................... 260/681

[56] References Cited

UNITED STATES PATENTS

| 1,841,055 | 1/1932 | Reppe et al. | 260/681 |
| 3,391,214 | 7/1968 | Fetterly | 260/681 |
| 3,290,403 | 12/1966 | Nemtsov et al. | 260/681 |
| 3,325,245 | 6/1967 | Rowton | 23/107 |
| 2,347,955 | 5/1944 | Korpi | 252/437 |
| 2,986,585 | 5/1961 | Denton | 260/632 |
| 3,510,537 | 5/1970 | Sheng et al. | 260/681 |

Primary Examiner—Delbert E. Gantz
Assistant Examiner—C. E. Spresser
Attorney—A. Thomas S. Safford

[57] ABSTRACT

As a new dehydration catalyst for epoxides or diols, lithium phosphate having a ratio of the numbers of Li to P atoms between 2,2 and 3; a process for preparing the catalyst and its uses have also been disclosed.

3 Claims, No Drawings

DEHYDRATION OF DIOLS USING LITHIUM PHOSPHATE CATALYST

This is a Division of application Ser. No. 30,276, filed Apr. 20, 1970 now abandoned.

This invention relates to a new dehydration catalyst; more particularly to a lithium phosphate catalyst. Further, this invention also relates to a method of preparing the catalyst as well as the use of this catalyst for the dehydration of diols and epoxides to dienes.

The catalytic properties of lithium phosphate, $Li_3PO_4$, in reactions of isomerization of epoxides in olefin alcohols are well known to those skilled in the art and the users of this catalyst for the conversion of epoxides into corresponding diolefins by isomerization of the epoxide into alcohol and the dehydration of said alcohol to form diolefin have already been described in the literature. In the employment of the catalyst, the isomerization and dehydration may, in particular be carried out simultaneously in the presence of lithium phosphate, which then acts as isomerization-dehydration catalyst.

It has been found unexpectedly that the catalytic properties of lithium phosphate in these isomerization reactions are closely related to the method of preparation of this compound. In particular, while the fact that the catalyst is customarily prepared in a basic medium by reacting an excess of lithium hydroxide with phosphoric acid, i.e. using a reaction mixture in which the ratio of the numbers of Li/P atoms is greater than 3, it has neither been known nor appreciated nor been foreseeable that below this threshold value, the lithium phosphate obtained constitutes a remarkable dehydration catalyst whose isomerizing properties are minimized in substantial degree.

The present invention has therefore as its object a dehydration catalyst comprising lithium phosphate prepared from phosphoric acid and lithium hydroxide under reaction conditions such that the ratio of the numbers of Li/P atoms of the reaction medium is between 2.2 and 3, and preferably between 2.4 and 2.9.

Another object of the invention is the method of preparing this catalyst.

As this method is particularly well adapted — as will be noted from the description given below — for the dehydration of a diol to a diene and the selective dehydration of an epoxide to diene, the invention has as its object also the use of this catalyst in these specific dehydration reactions.

In a preferred embodiment of the method of preparing the catalyst in accordance with the invention, one starts by reacting phosphoric acid with a solution of lithium hydroxide in proportions such that the phosphate $LiH_2PO_4$ is formed. The solution obtained is then mixed, while cold, with lithium hydroxide, in solution, in proportions such that the ratio of the numbers of Li/P atoms in the reaction medium is between 2.2 and 3, and preferably between 2.4 and 2.9. The precipitated phosphoate $Li_3PO_4$ is allowed to settle out and after removal of the liquid phase the precipitate is dried and calcined at 300°C. When the catalyst is prepared in the indicated manner, there is substantially no contamination by co-ions such as sodium or nitrates. Hence, the catalyst product performance can easily be controlled.

This method of preparation, although the preferred method, does not, however, constitute any limitation on the invention and the tests carried out by the applicant have proven that the lithium phosphate prepared in a single phase by direct mixing of the reagents has substantially equivalent catalytic activity, this activity and the selectivity of the catalyst depending essentially on the ratio of the number of Li/P atoms in the reaction medium for the preparation of the catalyst.

This will be evident from the following examples which are in no way limitative and which are directed merely at illustrating the application of the catalyst of the invention to the dehydration of epoxides and diols to dienes.

EXAMPLE I

A number of catalysts are prepared corresponding to different values of the ratio of the number of Li/P atoms of the preparation reaction medium by the following method: 123 g of $LiOH.H_2O$ are dissolved in 659 ml of water. To a third of this solution there are added X grams of 86 percent phosphoric acid ($H_3PO_4$) contained in 20 ml of water. To this cooled solution 90 g of ice are added, while 200 g of ice are added to the unused two-thirds of the lithium hydroxide solution. The two solutions are cooled until their temperature reaches 2°C; the $LiH_2PO_4$ solution is then rapidly mixed with the lithium hydroxide solution. The suspension is diluted to a volume of 4,000 ml; it is set aside for 12 hours. The precipitate is recovered and dried at 110°C.

Four catalysts are prepared by using respectively as value for X: 115.6, 111.3, 104.4 and 98 grams of 86% $H_3PO_4$; these catalysts correspond to a ratio of the number of Li/P atoms in the reaction mixture of 2.8, 3, 3.2 and 3.4 respectively.

Each catalyst is crushed into pieces of about 1 to 2 mm diameter and several glass tubes are filled with 10 cc of these catalysts. Each tube is brought to 300°C and is fed with methyl epoxy 2, 3-butane diluted in nitrogen at a rate of flow of 10 cc/hr for the epoxide and 3 l/hr for the nitrogen. Table I below gives the composition in percent by weight of the mixture obtained at the outlet of the tube for each catalyst. The analysis of this composition was carried out by gas phase chromatography and the numbers indicated correspond to the percentages of the ares of the chromatographic peaks.

TABLE I

| Li/P ratio of the reaction medium for the preparation of the catalyst | 2.8 | 3.0 | 3.2 | 3.4 |
|---|---|---|---|---|
| Conversion of the charge | 100 | 100 | 100 | 100 |
| Isoprene | 32.4 | 3.6 | 0.7 | 0.5 |
| Methyl isopropyl ketone | 37.3 | 1.6 | 4.1 | 5.2 |
| Dimethyl vinyl carbinol | | 0.6 | 1.4 | 1.4 |
| Methyl-2-buten-1-ol-3 | 22.8 | 61.6 | 45.1 | 45.0 |
| Trimethylacetaldehyde | 7.5 | 21.6 | 10.2 | 4.3 |
| Dimethyl-2,2-propanol-1 | | 8.0 | 34.8 | 36.4 |
| Miscellaneous | | 3.0 | 3.7 | 7.2 |

The comparison of the results obtained with the use of the different catalysts shows a far better formation of isoprene by dehydration of methyl-epoxy 2,3-butane on $Li_3PO_4$ when the catalyst has been formed in a reaction medium in which the Li/P ratio is equal to 2.8; it should also be noted that the use of this catalyst is accompanied only by a small quantitative change of the carbon structure of the initial epoxide, contrary to the other catalysts. Thus it is noted that the carbon structure of the methyl-epoxy-2,3-butane is modified by pinacol transposition to a much lesser extend when the catalyst of the invention is used; this consequence is important, since the transposed products (trimethyl-acetaldehyde and dimethyl-2,2-propanol-1) cannot be recycled in an isoprene preparation process, while methyl-epoxy-2,3-butane, methyl isopropyl ketone, dimethyl vinyl carbinol and methyl-2-buten-1-ol-3 which have not undergone any transposition can be recycled in an isoprene preparation process. This product recovery aspect constitutes a significant contribution in the dehydration of these starting compounds.

EXAMPLE II

The catalysts of Example I, (and 3 others for which the value of X is respectively: 128.0, 138.9 and 151.5 grams, corresponding to a Li/P ratio of 2.6, 2.4 and 2.2) are used to carry out the dehydration of methyl-butane-diol-2,3 into isoprene under the same operating conditions but at a temperature of 400°C.

Table II below gives the composition in percent by weight of the mixture obtained at the outlet of the tube for each catalyst. Analysis of this composition was effected by the method explained in Example I.

TABLE II

| | Li/P ratio of the preparation reaction medium | | | | | | |
|---|---|---|---|---|---|---|---|
| | 2.2 | 2.4 | 2.6 | 2.8 | 3.0 | 3.2 | 3.4 |
| | Conversion of the charge | | | | | | |
| | 100.0 | 100.0 | 100.0 | 98.5 | 96.8 | 65.4 | 34.5 |
| Isoprene | 48.5 | 62.1 | 64.0 | 55.3 | 21.7 | 3.6 | 1.0 |
| Methyl-epoxy-2,3-butane | 0.1 | | | | | 3.5 | 3.3 |
| Methyl isopropyl ketone | 29.4 | 29.8 | 29.4 | 25.7 | 22.2 | 24.4 | 24.4 |
| Dimethyl vinyl carbinol | | | | | 0.7 | 0.7 | 0.5 |
| Methyl-2-buten-1-ol-3 | 14.8 | 0.6 | | 14.2 | 18.2 | 11.1 | 8.7 |
| Methyl-2-hydroxy-2-butanone | | | | | 2.7 | 15.8 | 21.2 |
| Trimethylacetaldehyde | 4.1 | 5.1 | 4.1 | 3.3 | 23.2 | 13.3 | 10.0 |
| Dimethyl-2-2-propanol-1 | | | | | 4.4 | 18.8 | 22.9 |
| Miscellaneous | 2.5 | 1.8 | 1.9 | 1.5 | 6.9 | 8.8 | 8.0 |

Table II shows that the catalysts of the invention, that is to say, those one for which the Li/P ratio of the reaction medium is comprised between 2.2 and 3.0, produces the greatest conversion of the methyl-butane-diol-2-3; these catalysts have the greatest effectiveness for the dehydration of this charge into isoprene; finally, they have little isomerizing effect.

It should be noted by way of comparison that with a conventional dehydration catalyst such as boron phosphate or thorium dioxide, a very substantial isomerization is observed whereby the charge isomerizes into compounds having a carbonyl function. Thus by separately passing methyl-epoxy-2,3-butane and methyl-butane-diol-2,3 at 350°C over thorium dioxide with an hourly space velocity of 1, a conversion rate of the charge of 63.3 percent and 80.3 percent is obtained, a yield of compounds having a carbonyl function is 43.1 percent and 29.3 percent respectively and a yield of isoprene is 0 percent.

The use of the catalyst in accordance with the invention is particularly advantageous within a process in which an olefin is oxidized into epoxide or diol in order subsequently to obtain a diolefin. As a matter of fact, this catalyst gives only by-products sited on the same carbon, and particularly a ketonic, carbonyl structure which is possible to reconvert to the initial olefin, i.e., recycle, by reduction and dehydration, while, on the contrary, any product whose structure has been isomerized must be eliminated from the system and therefore constitutes a final loss.

The catalysts in accordance with the invention have the advantage that these can be calcined at about 600°C without losing their activity so that these can be regenerated after use.

What is claimed is:

1. In a method of dehydrating a vicinal diol to a diene the improvement consisting essentially of dehydrating said vicinal diol in the presence of lithium phosphate as a catalyst therefor, prepared from phosphoric acid and lithium hydroxide such that the ratio of the number of Li/P atoms in the reaction medium is between 2.2 and 3.

2. The method according to claim 1 and wherein the diol is methyl butane diol —2,3.

3. The method according to claim 1 and wherein the catalyst is prepared by reacting phosphoric acid and lithium hydroxide with each other in a reaction solution, said reaction solution is cooled, further reacting the cooled reaction solution with an additional amount of cooled lithium hydroxide to obtain a lithium phosphate such that the ratio of the number of Li/P atoms of the amounts of lithium hydroxide and phosphoric acid used in the reaction mixture is between 2.2 and 3, and recovering the catalyst.

* * * * *